(No Model.)
P. DOUGHERTY.
CORN PLANTING ATTACHMENT FOR PLOWS.
No. 290,006. Patented Dec. 11, 1883.
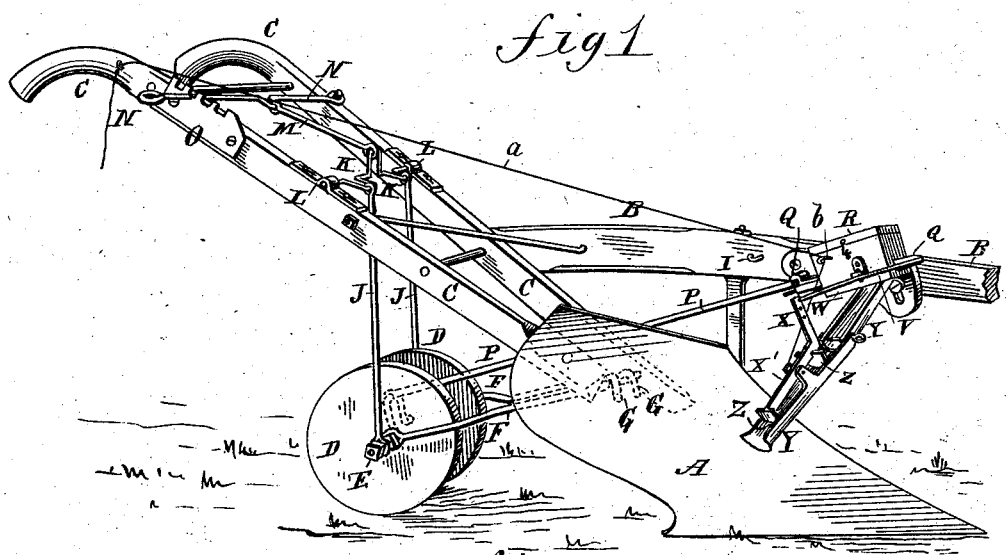
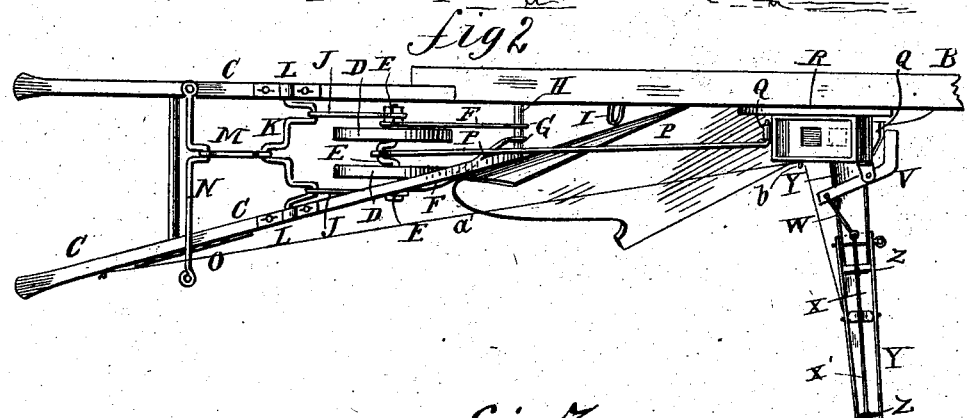
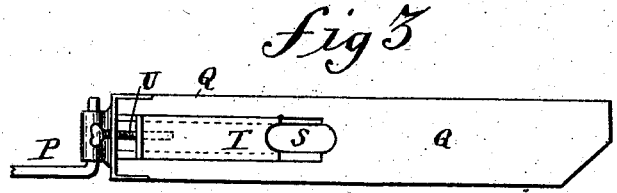
WITNESSES:
INVENTOR:
P. Dougherty
BY
ATTORNEYS.

UNITED STATES PATENT OFFICE.

PHILIP DOUGHERTY, OF FORT DODGE, IOWA.

CORN-PLANTING ATTACHMENT FOR PLOWS.

SPECIFICATION forming part of Letters Patent No. 290,006, dated December 11, 1883.

Application filed March 29, 1883. (No model.)

*To all whom it may concern:*

Be it known that I, PHILIP DOUGHERTY, of Fort Dodge, in the county of Webster and State of Iowa, have invented a new and useful Improvement in Corn-Planting Attachments for Plows, of which the following is a full, clear, and exact description.

Reference is to be had to the accompanying drawings, forming a part of this specification, in which similar letters of reference indicate corresponding parts in all the figures.

Figure 1 is a perspective view of my improvement, shown as applied to a plow. Fig. 2 is a plan view of the same. Fig. 3 is a plan view of the seed-dropping slide enlarged.

The object of this invention is to provide a convenient means for dropping corn in hills in advance of a turning-plow, and in the furrow previously plowed, so that the seed will be covered by the furrow-slice as it is turned.

The invention consists of the construction and combination of parts, substantially as hereinafter fully set forth and claimed.

A represents the mold-board, B the beam, and C the handles, of an ordinary turning-plow.

D are two small wheels, which are placed upon a crank-shaft, E, upon the opposite sides of its crank, and are secured in place by nuts screwed upon the crank-shaft, one upon each side of each wheel. The end parts of the crank-shaft E revolve in bearings in the rear ends of the rods F, which are secured in place by nuts screwed upon the said crank-shaft at the outer sides of the said rods. Upon the forward ends of the rods F are formed hooks G, which are hooked upon the lowest connecting-rod, H, of the plow-handles C when the planter is at work, and which, when the planter is not at work, are hooked into a staple, I, attached to the side of the plow-beam B. The ends of the crank-shaft E also revolve in bearings in the lower ends of the rods J, which are kept in place by nuts screwed upon the ends of the said shaft. The upper ends of the rods J are pivoted to two parallel cranks formed upon the shaft K, the ends of which rock in bearings L, attached to the plow-handles C.

Upon the center of the shaft K is formed a crank projecting at right angles with the two parallel cranks, and to which is pivoted the end of a connecting-rod, M. The other end of the connecting-rod M is pivoted to a lever, N, one end of which is pivoted to one of the plow-handles C, and its outer end engages with the teeth of a catch-bar, O, attached to the other plow-handle C, so that the wheels D can be raised from and lowered to the ground by operating the lever N.

To the crank-shaft E is pivoted the end of a connecting-rod, P, the other end of which is pivoted to the rear end of the seed-dropping slide Q. The slide Q works in the space between the two bottoms of the seed-box R, and receives seed through a hole in the upper bottom, and carries it to and drops it through a hole in the lower bottom of the said seed-box.

In the seed-dropping slide Q is formed an aperture, S, to receive seed, and which is regulated in size to drop more or less seed at a time by a sliding plate, T, placed in a slot in the slide Q, and adjusted by a screw, U, passing in through the end of the slide Q, or a bar or plate attached to the said end, the said screw being swiveled to the said slide Q or to the plate T. The forward end of the slide Q is beveled, so as to strike the inwardly-inclined end of the lever V, and operate the said lever. The lever V is pivoted to a support attached to the seed-box R, and to its other end is pivoted the end of a short connecting-rod, W, the other end of which is pivoted to the upper arm of the bar X. The bar X is pivoted to supports formed upon or attached to the conducting-spout Y, the inner end of which is attached to the seed-box R.

To the bar X are attached two valves, Z, which, as the said bar is vibrated, are alternately lowered to receive and stop the seed passing down the spout Y. The spout Y is jointed, so that its outer end can be adjusted as the depth of the intended furrow and the width of the furrow-slice may require, so that the seed will be dropped in the outer part of the previous furrow, and will be covered by the furrow-slice, to cause the plants to come up between the adjacent furrow-slices. Several holes are formed in the upper arm of the bar X, to receive the pivoting-pin, so that the said bar can be adjusted to correspond with the adjustment of the spout Y. With this construction, as the plow is drawn forward, the revolution of the wheels D will operate the slide Q to drop the seed into the spout Y. As the seed-dropping slide Q moves forward to drop the seed it operates the lever V to lower the inner valve Z, to receive and stop the seed, and raise the outer valve Z, to cause the seed in the outer part of the spout Y to drop to the ground in hills, and prevent the said seed from being scattered. As the slide Q moves back to again receive seed, the lever V and bar X are operated by the weight of the said bar X, or by a weight attached to the outer end of the said bar, to raise the inner valve Z, and allow the seed stopped by the said inner valve to slide down the spout Y to the outer valve Z, ready to be dropped at the next forward movement of the seed-dropping slide Q. The outer part of the jointed spout Y is supported by a cord, a, attached at one end to the said outer part of the spout. The cord a passes through a guide-staple, b, attached to the seed-box R, and its other end extends back and is secured to a handle C in such a position that it can be readily operated by the plowman to raise the outer part of the spout Y to pass over obstructions, or for any other desired purpose.

Having thus described my invention, I claim as new and desire to secure by Letters Patent—

1. In a corn-planting attachment for plows, the combination, with the plow-handles C, the wheels D, and the crank-shaft E, of the connecting-rods J M, the crank-shaft K, the lever N, and the catch-plate O, substantially as herein shown and described, whereby the said wheels can be readily raised from the ground, as set forth.

2. In a corn-planting attachment for plows, the combination, with the seed-slide with its box mounted on the plow-beam, of the spout arranged to extend obliquely from the seed-box, the lever V, adapted to be struck by the seed-slide, and the vibrating rod X, having the valves Z and the upwardly-projecting integral arm connected by a rod, W, to the lever V, the vibrating rod and its valves being arranged in the spout, substantially as and for the purpose set forth.

PHILIP DOUGHERTY.

Witnesses:
GEO. B. SHERMAN,
JARED FULLER,
JOHN MARTIN.